(12) United States Patent
Collins et al.

(10) Patent No.: US 7,630,924 B1
(45) Date of Patent: Dec. 8, 2009

(54) TRANSACTION VELOCITY COUNTING FOR FRAUD DETECTION

(75) Inventors: Jim Collins, Redmond, WA (US); Avinash Kalgi, Bellevue, WA (US); John Medlong, Seattle, WA (US); Paul Lisagor, Auburn, WA (US)

(73) Assignee: Authorize.net LLC, Mountain View, CA (US)

( * ) Notice: Subject to any disclaimer, the term of this patent is extended or adjusted under 35 U.S.C. 154(b) by 549 days.

(21) Appl. No.: 11/109,979

(22) Filed: Apr. 20, 2005

(51) Int. Cl.
*G06Q 40/00* (2006.01)
(52) U.S. Cl. ............... 705/35; 705/2; 705/38; 705/40; 705/44; 705/68; 341/90; 235/380; 379/189; 707/1; 707/6; 713/503
(58) Field of Classification Search ........... 705/35, 705/2, 38, 40, 44, 68; 235/380; 379/189; 341/90; 707/6, 1; 713/503
See application file for complete search history.

(56) References Cited

U.S. PATENT DOCUMENTS

| 5,293,627 | A | * | 3/1994 | Kato et al. ............... 713/503 |
| 5,544,086 | A | * | 8/1996 | Davis et al. ............... 705/68 |
| 5,561,794 | A | * | 10/1996 | Fortier ..................... 707/8 |
| 5,621,796 | A | * | 4/1997 | Davis et al. ............... 705/68 |
| 5,819,226 | A | * | 10/1998 | Gopinathan et al. ........... 705/44 |
| 5,884,289 | A | * | 3/1999 | Anderson et al. ............. 705/44 |
| 6,095,413 | A | * | 8/2000 | Tetro et al. ................. 235/380 |
| 6,122,624 | A | * | 9/2000 | Tetro et al. ................. 705/44 |
| 6,181,814 | B1 | * | 1/2001 | Carney ..................... 382/137 |
| 6,212,266 | B1 | * | 4/2001 | Busuioc .................... 379/189 |
| 6,618,725 | B1 | * | 9/2003 | Fukuda et al. ............... 707/6 |
| RE38,572 | E | * | 8/2004 | Tetro et al. ................. 235/380 |
| 7,177,864 | B2 | * | 2/2007 | Ekhaus ..................... 707/6 |
| 2002/0194119 | A1 | * | 12/2002 | Wright et al. ............... 705/38 |
| 2003/0097330 | A1 | * | 5/2003 | Hillmer et al. .............. 705/38 |
| 2003/0158751 | A1 | * | 8/2003 | Suresh et al. ............... 705/2 |
| 2003/0163398 | A1 | * | 8/2003 | Yoshioka et al. ............. 705/35 |
| 2003/0182214 | A1 | * | 9/2003 | Taylor ...................... 705/35 |
| 2003/0212658 | A1 | * | 11/2003 | Ekhaus ..................... 707/1 |
| 2004/0119617 | A1 | * | 6/2004 | Brown et al. ................ 341/90 |
| 2004/0148256 | A1 | * | 7/2004 | Bramnick et al. ............ 705/40 |

FOREIGN PATENT DOCUMENTS

FR    EP 1131800    * 11/1998

OTHER PUBLICATIONS

Coderre, David. "Fraud Detection: Using Data Analysis Techniques to Detect Fraud," Global Audit Publications (GAP). ©1999.*

* cited by examiner

*Primary Examiner*—Charles R Kyle
*Assistant Examiner*—Robert R Niquette
(74) *Attorney, Agent, or Firm*—Hickman Palermo Truong & Becker LLP; Adam C. Stone

(57) ABSTRACT

Methods and systems for detecting fraud based on velocity counts are disclosed.

12 Claims, 6 Drawing Sheets

Initial Buckets  76

| 60 | 62 | 64 | 66 |

Roll-up Buckets  78

| 68 | 70 | 72 | 74 |

FIG. 3

| Bucket type | Bucket # | Timestamp |
|---|---|---|
| 5-minute (hourly) | 15 | 01/13/2004 09:15:00 |
| 1-hour (daily) | 09 | 01/13/2004 09:00:00 |
| 6-hour (weekly) | 09 | 01/13/2004 06:00:00 |
| 1-day (monthly) | 13 | 01/13/2004 00:00:00 |

*FIG. 7*

```
        If bucket # 15 is empty then
    Increment the counter and set the timestamp to 01/13/2004 09:15:00
  Else if the timestamp on bucket #15 equals the new timestamp then
    Increment the counter (new transaction is for the same time period as
                           the existing count)
  Else (existing count is old, it must be rolled up before counting new
                           transaction)
    Read existing timestamp from bucket #15 on the 5-minute record
    Format timestamp for a 1-hour record as 01/13/2004 09:00:00
                                . . .
    Add the current bucket #15 count to the 1-hour bucket #09
           Set count for bucket #15 to 1
                             End
```

*FIG. 8*

TRANSACTION VELOCITY COUNTING FOR FRAUD DETECTION

BACKGROUND

Rule-based fraud detection (RBFD) of transactions can be data intensive and/or computationally intensive, especially in a system that receives a high volume of transactions. For example, many payment systems require processing transactions involving hundreds to thousands of active merchants in a relatively short time. RBFD can involve either computing the number of transactions in a particular time interval in real time or maintaining a large amount of data. In addition, RBFD often requires maintaining transaction volume data representing the number of transactions that occur during different time intervals (e.g., transactions received in the last hour, last day, and the last month).

SUMMARY

In one aspect, a method for the transaction counting in a fraud detection system includes providing a plurality of initial-buckets and a plurality of roll-up buckets. Each of the initial-buckets and roll-up buckets can include a bucket count and a bucket timestamp. The method also includes receiving a transaction that includes a transaction timestamp and, on the basis of the transaction timestamp and the bucket timestamp, determining a particular initial-bucket in which to store the transaction. The method also includes determining that the particular initial-bucket timestamp is less than a formatted transaction timestamp, adding the bucket count for the particular initial-bucket to a bucket count of a particular roll-up bucket, and storing the transaction in the particular initial-bucket.

Embodiments can include one or more of the following. The method can include formatting the transaction timestamp to generate a formatted transaction timestamp. Formatting the transaction timestamp can include setting the formatted transaction-timestamp to be equal to the bucket timestamp. The method can include selecting the bucket timestamp to be the bucket timestamp of the particular initial bucket. The method can include setting the formatted transaction-timestamp to identify the particular initial bucket. Formatting the transaction timestamp can include rounding the transaction timestamp down to an earliest time in a time interval for the particular bucket. The method can include comparing the formatted transaction timestamp to the bucket timestamp for the particular one of the initial-buckets. The method can include incrementing the bucket count for the particular initial-bucket if the bucket timestamp is equal to the formatted transaction timestamp. Storing the transaction can include incrementing the bucket count for the particular bucket. Adding the bucket count for the particular one of the initial-buckets to one of the roll-up buckets can include determining a particular one of the roll-up buckets associated with the bucket count for the particular initial-bucket based on the transaction timestamp for the particular initial-bucket and the bucket timestamp for the roll-up bucket. Each of the initial-buckets and roll-up buckets can be associated with a particular time interval. The time interval associated with the initial buckets can be different than the time interval associated with the roll-up buckets. The method can also include storing each transaction in the transaction counting system in only one of the initial-buckets and roll-up buckets at a time. The method can also include classifying a transaction as a potentially fraudulent transaction. Classifying a transaction as a potentially fraudulent transaction can include performing rule-based fraud detection based on the counts stored in the initial-buckets and roll-up buckets.

In another aspect, a method includes providing a first set of buckets where each bucket in the first set of buckets is associated with a corresponding time interval having a first duration and providing a second set of buckets where each bucket in the second set of buckets is associated with a time interval having a second duration and the second duration is greater than the first duration. The method also includes storing data associated with a transaction in a particular bucket selected from the first set of buckets based on an arrival time of the transaction and following lapse of predetermined time interval and receipt of an additional transaction, moving the transaction to a particular bucket selected from the second set of buckets such that the transaction is stored in only one bucket at any given time.

Other features and advantages of the invention will become apparent from the following description, and from the claims.

DESCRIPTION OF DRAWINGS

FIG. 3 is a block diagram of multiple the transaction counting buckets for various time intervals.

FIG. 7 is a table showing the bucket number and timestamp for an exemplary transaction.

FIG. 8 shows pseudo-code for a transaction counting process.

DESCRIPTION

Figure 1:
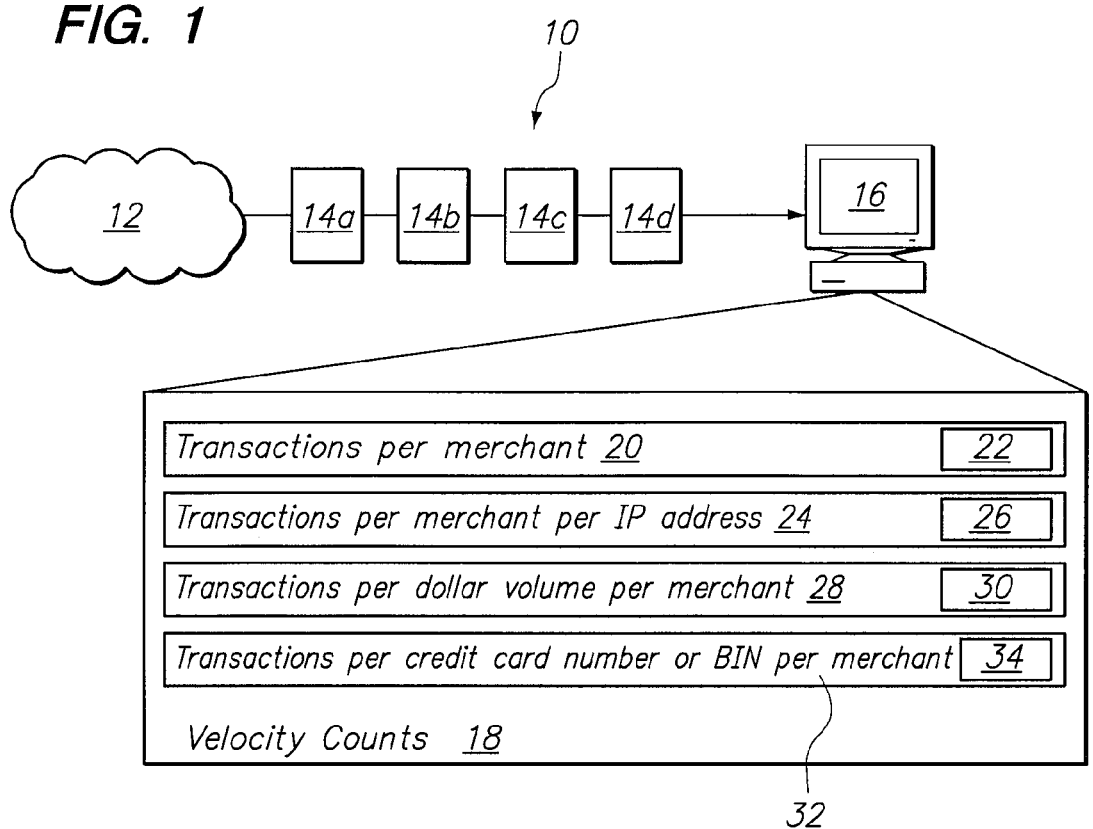
FIG. 1 is a block diagram of a transaction velocity counting system.
Figure 2:
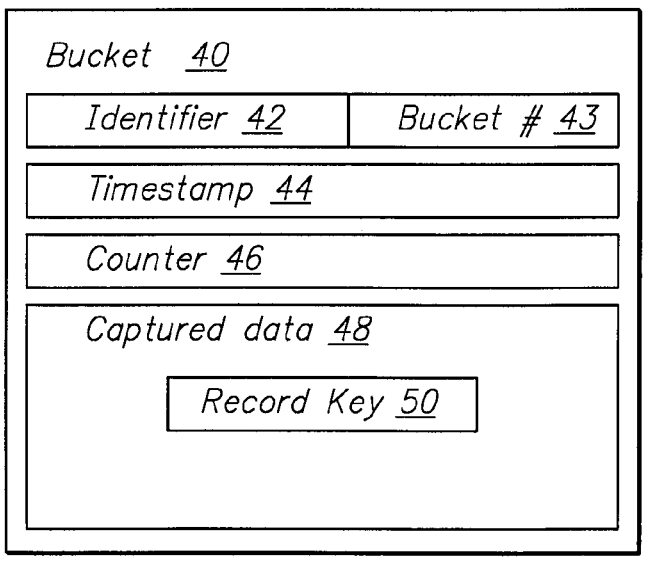
FIG. 2 is a block diagram of a bucket.

Referring to FIG. 1, a transaction counting system 10 for fraud detection performs real time aggregation and accumulation of transaction volume data. The transaction counting system 10 does so by maintaining multiple buckets 40, one of which is shown in FIG. 2, to track the transaction volume. The transaction counting system 10 maintains at least two sets of buckets 40. A first set of buckets, referred to as initial-buckets, is used to initially count and store a transaction. A second set of buckets, referred to as roll-up buckets, is used to store and count and accumulate older transactions from the initial-buckets. The transaction counting system 10 counts and stores transactions (e.g., transactions 14a-14d) in a single bucket at a time. As described below, the transaction counting system 10 applies an "as needed" roll-up strategy to minimize its computation and storage requirements.

In general, the transaction counting system 10 includes a computer 16 connected to a network 12. The computer 16 receives, through the network 12, transaction data 14a-14d associated with transactions occurring in real time. Each element of transaction data includes a transaction timestamp indicating when the transaction occurred. Based on the received transaction data 14a-14d, the computer 16 maintains various velocity counts 18 (e.g., transactions per unit time). For transaction data that represents payments, examples of velocity counts 18 include transactions-per-merchant 20, transactions-per-merchant-per-IP-address 24, transaction-dollar-volume-per-merchant 28, and transactions-per-creditcard-number-(or BIN)-per-merchant 32. Any anomalies or unusual features in the velocity counts 18 can be indicative of fraud.

Each velocity count 18 includes a key (e.g., keys 22, 26, 30, and 34). A key 22 is an identifier that describes a particular characteristic of the transaction data 14a-14d that is being counted by the particular velocity count 18 for subsequent rule-based fraud detection. For example, the transactions-per-merchant velocity count 20 uses the merchant ID as its key 22, the transactions-per-merchant-per-IP address velocity count 24 uses the merchant ID and IP address as its key 26, the transaction-dollar-volume-per-merchant velocity count 28 uses the merchant ID as its key 30, and the transaction-per-card-number-per-merchant velocity count 32 uses the merchant ID and card number as its key 34. The process of maintaining the velocity counts is similar for each type of velocity count 18. The primary difference between the various velocity counts 18 is the data element being counted.

Each of the velocity counts 18 can be maintained for various time intervals. For example, in the payment transaction-processing environment, the transaction counting system 10 may maintain velocity counts representing transactions per hour, per day, per week, and/or per month. In various other environments, it may be desirable to maintain velocity counts 18 on smaller time intervals (e.g., per second or per minute) or on larger time intervals (e.g., per quarter or per year).

Referring to FIG. 2, the transaction counting system 10 stores transaction data in multiple buckets (e.g., bucket 40). A bucket 40 is a logical representation of a set of memory locations used to store data about transactions that occur during a designated time interval. The transaction counting system 10 counts a transaction 14 by storing the transaction in an appropriate bucket 40 selected based on a timestamp identifying the transaction. Each bucket 40 includes a bucket type identifier 42, a bucket number 43, a bucket timestamp 44, a counter 46, and captured data 48 representing transactions in the bucket.

The bucket type identifier 42 identifies the duration of a time interval during which that bucket 40 accumulated transactions. Buckets that accumulate transactions for different intervals of the same duration are assigned the same bucket type identifier 42. For example, all buckets that accumulate transactions for a 5-minute interval would have the same bucket identifier 42, and all buckets accumulating transactions for a 1-hour time interval would have a different bucket identifier 42.

The bucket number 43 specifies a particular time-interval associated with the transactions stored in the bucket 40. For example, if the transaction counting system 10 includes hourly counts that are identified by the same bucket identifier 42, each hourly count bucket (e.g., a bucket for 8:00-9:00, a bucket for 9:00-10:00, etc.) would be assigned a different bucket number 43.

Each bucket 40 also includes a bucket timestamp 44 that identifies the time-of-arrival associated with transactions currently stored in the bucket 40. For example, if the bucket is an hourly count bucket (as designated by the bucket type identifier 42) for the 8:00-9:00 time interval (as designated by the bucket number 43), the bucket timestamp 44 would indicate what particular 8:00-9:00 hour is counted. For example, the bucket timestamp 44 could indicate the particular date and year associated with the transactions currently stored in the bucket 40.

In addition, the bucket 40 includes a counter 46, which represents a total number of transactions accumulated in the bucket 40, and captured data 48 about each of the transactions counted in the bucket at a particular time. The captured data 48 includes a record key 50 that identifies a particular piece of information about the transaction. The record key 50 can be used in combination with the count stored on the counter 46 by various algorithms for fraud detection.

FIG. 3 shows two sets of buckets 40. A bucket associated with the smallest time interval used in the transaction counting system 10 will be referred to as an initial-bucket. Upon receiving transaction data 14a the transaction counting system 10 allocates the transaction to one of the initial-buckets based on a comparison between the transaction timestamp and both the bucket type identifier 42 and the bucket number 43 of the bucket 40. In the example shown in FIG. 3, the transaction counting system 10 includes four initial-buckets 76 (e.g., buckets 60, 62, 64, and 64). As described above, each of the initial-buckets 76 will have an identifier 42, a bucket number 43, a bucket timestamp 44, and a counter 46 associated with it. Upon receiving transaction data 14a, the transaction counting system 10 increments the counter 46 (not the bucket number 43) for the appropriate one of the initial-buckets 76.

The system also includes "roll-up" buckets 78 (e.g., roll-up buckets 68, 70, 72, and 74). Roll-up buckets 78 are buckets having bucket numbers 43 that represent time intervals of longer duration than the time intervals identified by the bucket numbers 73 of the initial-buckets 76. Transaction counting system 10 uses roll-up buckets 78 for aggregating counts from the initial-buckets 76 so that the initial-buckets 76 can be re-used for a subsequent time interval. Thus, the counter 46 in a particular roll-up bucket 78 contains an accumulated total of the counts for the appropriate set of preceding initial-buckets 76.

For example, the transaction counting system 10 could include four initial counting buckets, each of which accumulates transactions received during a corresponding 15-minute time interval and roll-up buckets for each hour. Thus, during each successive hour, the four 15-minute interval initial-buckets would be re-used to receive new transactions, and the transaction counts would be rolled up (i.e., counted in and stored) in an appropriate hourly bucket. The roll-up process thus ensures that each transaction need only be counted in one bucket 40 at a time.

Figure 4:
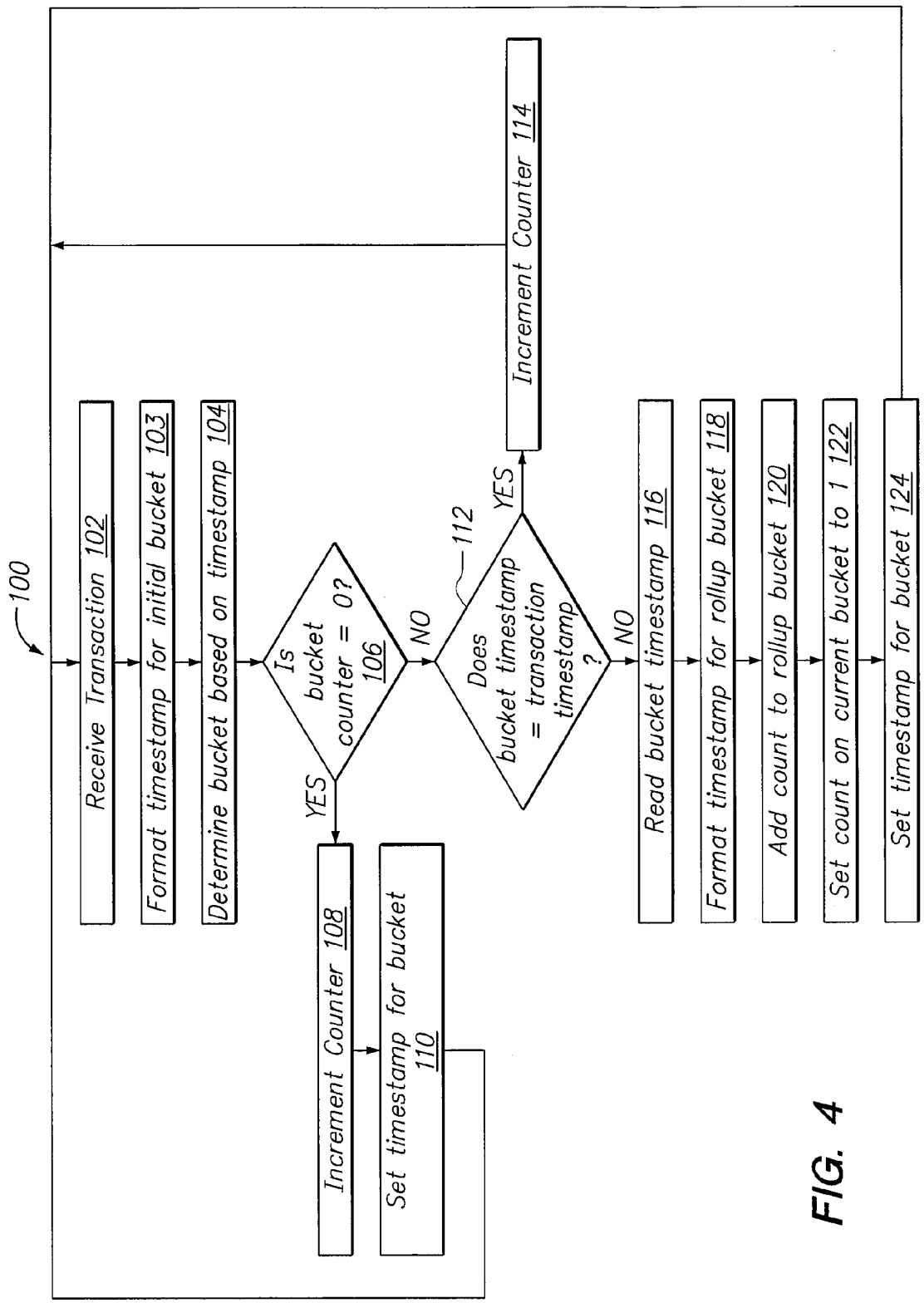
FIG. 4 is flow chart of a transaction counting process.

FIG. 4 shows a counting process 100 for maintaining the transaction count based on two sets of buckets (e.g., a set of initial-buckets 76 and a set of roll-up buckets 78). The process begins with the transaction counting system 10 receiving a transaction (step 102), formatting the transaction's timestamp (step 103) and determining, on the basis of the transaction's formatted timestamp, into which initial-bucket 76 to place the transaction (step 104). One way that the transaction counting system 10 determines which initial-bucket is to receive a transaction is by rounding the transaction's timestamp down to the nearest multiple of the time increment used for the initial-buckets (this procedure will be referred to as formatting the timestamp). For example, if the initial-buckets are based on 15 minute time intervals and a transaction timestamp was 18 minutes past the hour (xx:18), the transaction counting system 10 would round transaction timestamp to the nearest multiple of the fifteen-minute time interval for the initial-buckets. In this example, the transaction timestamp would be rounded down to xx:15. Thus, based on a comparison of the transaction timestamp to the initial-bucket timestamp, the transaction counting system 10 determines that the transaction belongs in the bucket for transactions occurring between xx:15 and xx:30.

After the transaction counting system 10 determines the appropriate initial-bucket 76 with which to associate the transaction (step 104), the transaction counting system 10 determines if the initial-bucket counter for the initial-bucket is equal to zero, i.e., that the initial-bucket is empty (step 106). If the initial-bucket counter is equal to zero, the transaction counting system 10 increments the initial-bucket counter (i.e. changes the initial-bucket counter from 0 to 1) (step 108) and sets the initial-bucket timestamp for the initial-bucket (step 110).

If the transaction counting system 10 determines that the initial-bucket counter is not equal to zero, i.e., that the initial-bucket is not empty (step 106), the transaction counting system 10 determines if the transaction timestamp equals the initial-bucket timestamp (step 112). If the transaction timestamp is equal to the initial-bucket timestamp, the transaction counting system 10 increments the initial-bucket counter, i.e., sets the initial-bucket counter equal to its current count plus 1 (step 114). Otherwise, the transaction counting system 10 reads the initial-bucket timestamp (step 116) and formats a roll-up bucket timestamp for a roll-up bucket 78 (step 118). For example, the transaction counting system 10 can round the initial-bucket timestamp down to the nearest multiple based on the time increment used for the roll-up bucket. The transaction counting system 10 then adds the initial-bucket count to the count of the roll-up bucket (step 120). The transaction counting system 10 also sets the initial-bucket's counter to one (step 122) and sets the initial-bucket timestamp (step 124).

The counting process 100 reduces storage requirements by using roll-up counts, rather than redundantly storing records within each type of bucket. In addition, the counting process 100 captures only the data required to make rules-based decisions. In some embodiments, the record key and count are stored while additional data about the transaction is not stored. When the quantity of data can be kept small, the efficiency of the transaction counting system is increased.

In some embodiments, the transaction volume may be low enough that a new transaction is not placed in a particular bucket during each successive time interval. This can result in the bucket timestamp for the bucket becoming old. For example, transaction volumes may be lower during certain times of the day or during certain days of the month. In some embodiments, the count for a particular bucket is rolled-up only when a new transaction is received for the bucket (e.g., the system adds the count from a smaller time-division bucket to a larger time-division roll-up bucket only when a new transaction is received for the smaller time-division bucket). This can provide the advantage of reducing the computational burden for the system since the roll-up processing occurs only as needed.

Figure 5:
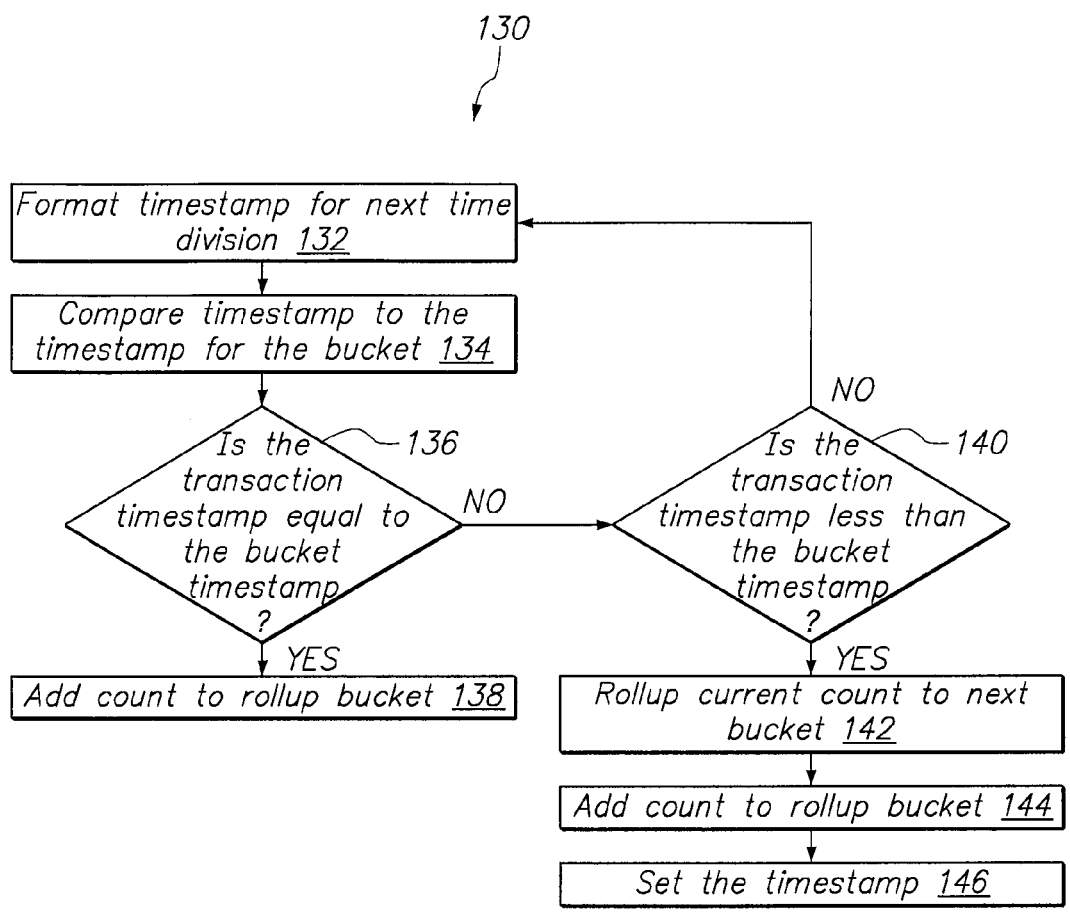
FIG. 5 is flow chart of a roll-up counting process.

FIG. 5 shows a counting process 130 for processing roll-up counts on an as-needed basis. As described in connection with FIG. 4, when the transaction counting system 10 receives a new transaction (e.g., either a new transaction to the system or a new roll-up transaction), it determines if there is an old count in the bucket that needs to be re-allocated to a different bucket. If such a count exists, the transaction counting system 10 determines the appropriate bucket to move the count to.

In order to determine the appropriate bucket for the roll-up count, the transaction counting system 10 formats the bucket timestamp from the current bucket for the next time division (step 132) and compares this formatted bucket timestamp to the timestamp for the roll-up buckets (step 134). If the transaction timestamp is equal to the bucket timestamp, then the transaction counting system 10 adds the count to the roll-up bucket (step 138). If the transaction timestamp is more recent than the roll-up bucket timestamp, then the bucket count for the roll-up bucket is old, and the roll-up bucket count is rolled up into a higher-level bucket (step 142). The transaction counting system 10 also adds the count to the roll-up bucket (step 144) and sets the bucket timestamp for the roll-up bucket equal to the timestamp for the transaction (step 146). If the transaction timestamp is greater than the bucket timestamp (i.e., the transaction is older than the transactions currently stored in the roll-up bucket), then the transaction counting system 10 formats the bucket timestamp for the next time division (step 132).

For example, based on process 130, if the transaction counting system 10 includes hourly (e.g., based on a time interval of X minutes), daily (e.g., based on an hourly time interval), and monthly counts (e.g., based on daily time interval), an hourly count to be rolled-up from the hourly bucket may belong to the daily bucket, the monthly bucket, or neither bucket depending on how old the count is. For example, if the hourly count to be rolled up has a timestamp of 1/1/05 08:30 and the subsequent transaction for the hourly bucket is received at 1/1/05 09:30, then the transaction would belong to the daily bucket that stores all transactions for the 8:00-9:00 hour on 1/1/05. However, if an hourly count to be rolled up has a timestamp of 1/1/05 08:00 and the next transaction for the hourly bucket is received at 1/5/05 08:00 (i.e., 4 days later), the roll-up transaction will not belong in any of the current daily buckets (e.g., the buckets for transactions received on 1/4/05) but will instead belong in the monthly bucket that stores all transactions for 1/1/05. In addition, if an hourly count to be rolled up has a timestamp of 1/1/05 08:00 and the next transaction for the hourly bucket is received at 3/5/05 08:00 (i.e., 2 months and 4 days later), the roll-up transaction will not belong in any of the buckets currently counted.

Figure 6:
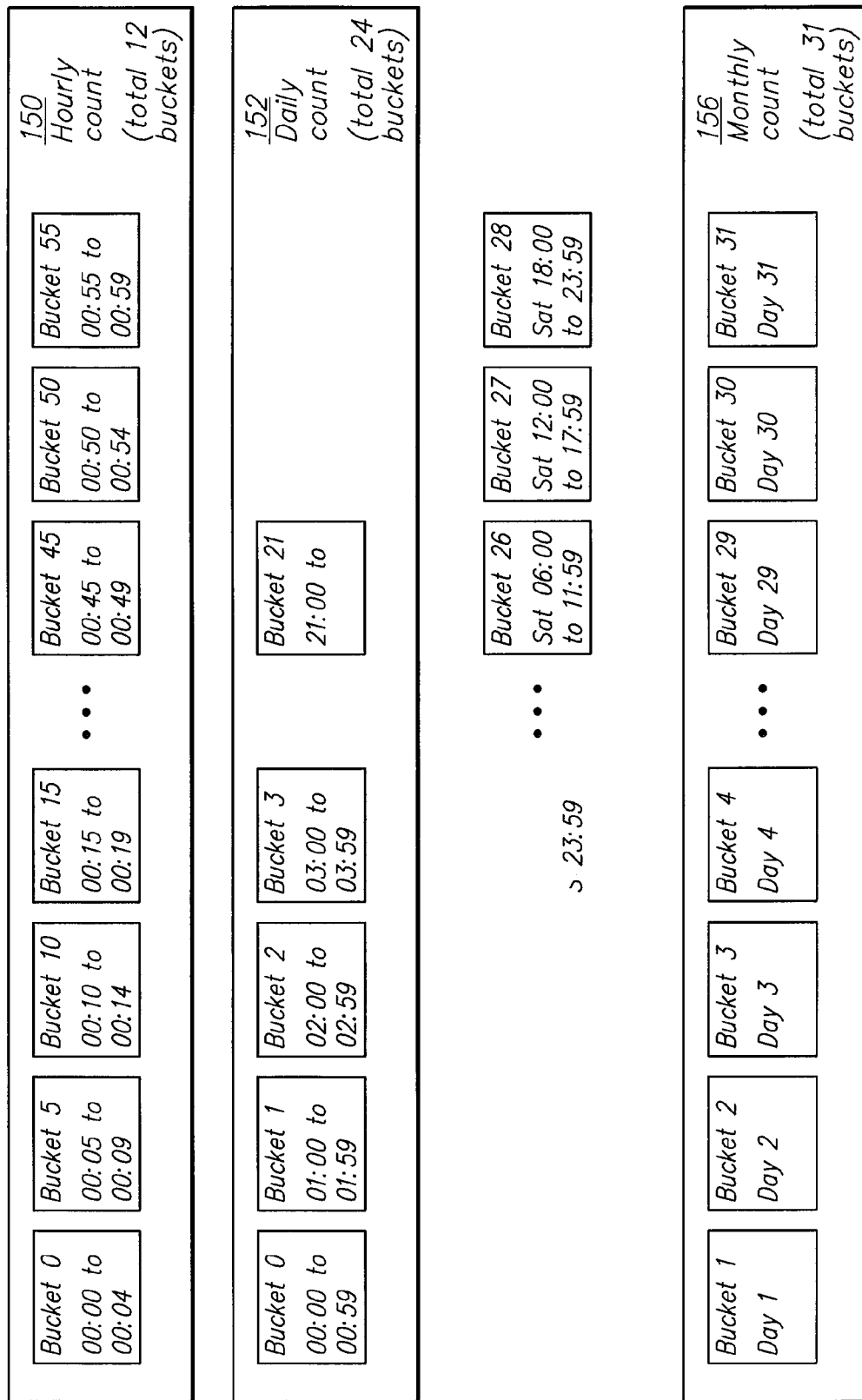
FIG. 6 is a block diagram of multiple the transaction counting buckets for various time intervals.

FIG. 6 shows an exemplary set of time divisions for a set of buckets based on hourly, daily, weekly, and monthly transaction velocity counts 18. The transaction counting system 10 maintains the transaction velocity counts 18 for the most recent hour (relative to the current time) in five-minute intervals. This gives an hourly rate that is accurate to within five minutes. For the hourly count 150, each key would require at most twelve records since there are twelve five-minute intervals in an hour. The transaction counting system 10 maintains counts for the most recent day in one-hour intervals. This gives a daily rate that is accurate to within one hour. For the daily count 152, each key would require at most twenty-four records since there are 24 hours in a day. The transaction counting system 10 maintains counts for the most recent week in six-hour intervals. This gives a weekly rate that is accurate to within six hours. For the weekly count 154, each key would require at most twenty-eight records since there are twenty-eight six-hour intervals in one week. The transaction counting system 10 maintains counts for the most recent month (e.g., 30 days) in one-day intervals. This gives a monthly rate that is accurate to within one day. For the monthly count 156, each key would require at most thirty-one records since there are at most thirty-one days in a month.

In general, the bucket number 43 for each bucket can be assigned in various ways. In some embodiments, for the five-minute interval buckets used for the hourly count 150, the bucket number can be the lowest minute in the set of five minutes. Thus, the bucket for minutes 0 through 4 would be assigned bucket number 0. The bucket the minutes 5 through 9 would be assigned bucket number 5. This continues up to the bucket for minutes 55 through 59 that would be assigned bucket number 55.

The bucket numbers 43 for buckets that store the daily count 152 are determined in a similar manner using the hour of the day. The bucket that includes the count for the time interval of 00:00 through 00:59 is assigned bucket number 0.

The bucket that includes the count for the time interval of 01:00 through 01:59 is assigned bucket number 01. This continues up to bucket 23 that stores the count for the time interval of 23:00 through 23:59.

The bucket number 43 for the buckets that store the weekly count 154 is calculated in a different manner. Since the weekly counts are stored in six-hour intervals, an algorithm is used to calculate the bucket number. The day of the week (Sunday=0, Monday=1, Tuesday=2, etc.) multiplied by four is added to the hour-set number (e.g., the hour-set number for the first set of 6 hours including 00:00-05:59 would be 0, the hour-set number for the second set of 6 hours including 06:00-11:59 would be 1, etc.) to generate the bucket number 43. For example, counts for Monday between 06:00 and 11:59 would be in bucket 5 (i.e., 1*4+1).

The monthly counts 156 use the day of the month as the bucket number.

As described above, each bucket 40 has a bucket timestamp 44 associated with it. The bucket timestamp 44 is rounded to the lowest interval of time for the bucket 40. For example, FIG. 7 shows a table of the bucket type 42, bucket number 43, and bucket timestamp 44 that might be used for a transaction with a submit time of Tuesday, January 13, 2004 09:18:37. Using the buckets shown in FIG. 6, a packet with this timestamp would be placed in bucket number 15 of the twelve five-minute interval buckets (e.g., for hourly count 150) and the timestamp would be recorded as 1/13/04 09:15:00. In the daily count 152 (based on 1 hour intervals), this transaction would be placed in bucket number 09 and assigned a timestamp of Jan. 13, 2004 09:00:00. In the weekly count 154 (based on 6 hour intervals), this transaction would be placed in bucket number 09 and assigned a timestamp of 1/13/04 06:00:00. In the monthly count 156 (5 minute, one hour, one day, one month, one year, etc.) (based on 1 day intervals), this transaction would be placed in bucket number 13 and assigned a timestamp of 1/13/04 00:00:00.

FIG. 8 shows a pseudo code representation of how this exemplary transaction with a timestamp of 1/13/04 09:18:37 moves through the transaction counting system 10 based on the multiple buckets shown in FIG. 6. As described above, the transaction belongs to only one bucket at a time. When the transaction enters the system on Tuesday, January 13, 2005 09:18:37, the transaction counting system 10 initially places it in bucket 15. If bucket number 15 is empty then bucket 15's counter is incremented and its bucket timestamp is set to 1/13/04 09:15:00. If bucket 15 is not empty, and if its bucket timestamp equals the transaction timestamp for the transaction, then the transaction counting system 10 increments bucket 15's counter. The bucket timestamp does not need to be reset because the new transaction is for the same time interval as the existing count. If the bucket is not empty, and if the transaction timestamp is not equal to bucket 15's formatted timestamp, then the existing count in bucket 15 is old and the transaction counting system 10 rolls up the existing count before counting new transaction. In order to roll-up the existing count, the transaction counting system 10 reads the existing timestamp from bucket 15 on the 5-minute record and formats the timestamp for a 1-hour record as 1/13/04 09:00:00. The transaction counting system 10 adds the current count for bucket number 15 to the 1-hour bucket number 09. The transaction counting system also sets the count for bucket number 15 to 1 and sets the timestamp for bucket number 15 to 1/13/04 09:15:00.

The process of checking for old data and rolling the old data forward as needed applies to all bucket types in a similar manner as the above example demonstrates for the 5-minute bucket type.

While in embodiments described above, transaction counting system 10 counts the number of transactions during a specified period of time, other volumes could be counted. For example, accumulators, or another count other than transactions, could be determined by the system. Such a count or volume could be accumulated to determine volume within a set period of time, irrespective of the number of transactions required for the volume. For example, transaction counting system 10 could maintain a count of total dollar volume in which various transactions have different dollar volumes.

While in some of the embodiments described above, transaction counting system 10 is used for fraud detection, the transaction counting system 10 can be used in various other contexts and for various applications.

Other embodiments are within the scope of the following claims.

What is claimed is:

1. A method for transaction counting in a fraud detection system, the method comprising:
   storing in a memory of a computer, a plurality of initial-buckets associated with a first time interval and a plurality of roll-up buckets associated with a second time inter-val, wherein the first time interval is contained within the second time interval;
   at the computer, receiving a transaction from a network, the transaction including a transaction timestamp;
   formatting the transaction timestamp to generate a formatted transaction time-stamp;
   based on said transaction timestamp, determining a particular initial-bucket of said plurality of initial-buckets in which to store the transaction;
   wherein said particular initial-bucket is associated with a sub-time interval of said first time interval;
   wherein said particular initial-bucket has a bucket count that indicates a number of one or more previously received transactions that occurred during said sub-time interval of said first time interval;
   in response to the computer determining that a time indicated by said transaction timestamp is not within said sub-time interval of said first time interval, the computer adding the bucket count for the particular initial-bucket to a bucket count of a particular roll-up bucket; and
   storing the transaction in the particular initial-bucket in the memory of the computer.

2. The method of claim 1, wherein said determining a particular initial-bucket of said plurality of initial-buckets to store the transaction is based on said formatted transaction timestamp.

3. The method of claim 1, wherein said particular initial-bucket is associated with a bucket timestamp.

4. The method of claim 3, wherein said particular roll-up-bucket is determined based on said bucket timestamp associated with said particular initial-bucket.

5. The method of claim 1, further comprising:
   storing a plurality of second roll-up buckets associated with a third time interval, wherein the first and second time intervals are contained within the third time interval;
   wherein the particular roll-up bucket is associated with a sub-time interval of said second time interval;
   wherein said particular roll-up bucket has a roll-up bucket count that indicates a number of one or more previously received transactions that occurred during said sub-time interval of said second time interval; and
   in response to the computer determining that a time indicated by said transaction timestamp is not within said sub-time interval of said second time interval, the computer adding the roll-up bucket count for the particular roll-up bucket to a bucket count of a roll-up bucket of said plurality of second roll-up buckets.

6. The method of claim 3, further comprising:
formatting said bucket timestamp to produce a formatted bucket timestamp; and
wherein said particular roll-up bucket is determined based on said formatted bucket timestamp.

7. The method of claim 1, further comprising:
setting said bucket count of said particular-initial bucket to 1 so that said bucket count of said particular initial bucket no longer indicates a number of one or more previously received transactions that occurred during said sub-time interval of said first time interval.

8. The method of claim 3, further comprising:
setting said bucket timestamp associated with said particular initial-bucket to a time that is after than the end of said first time interval.

9. The method of claim 1, further comprising:
formatting the transaction timestamp to generate a formatted transaction time-stamp;
wherein said particular initial-bucket is associated with a bucket timestamp; and
wherein determining that a time indicated by said transaction timestamp is not within said sub-time interval of said first time interval includes comparing said formatted transaction timestamp to said bucket timestamp.

10. The method of claim 1, wherein said plurality of initial-buckets and said plurality of roll-up buckets store a plurality of transactions that include said transaction, and wherein each transaction of said plurality of transactions is concurrently stored in no more than one bucket of said plurality of initial-buckets and said plurality of roll-up buckets.

11. The method of claim 1, further comprising:
classifying a transaction as a potentially fraudulent transaction.

12. The method of claim 11, wherein classifying a transaction as a potentially fraudulent transaction comprises performing rule-based fraud detection based on the counts stored in the initial-buckets and roll-up buckets.

* * * * *

UNITED STATES PATENT AND TRADEMARK OFFICE
CERTIFICATE OF CORRECTION

PATENT NO. : 7,630,924 B1  Page 1 of 1
APPLICATION NO. : 11/109979
DATED : December 8, 2009
INVENTOR(S) : Jim Collins et al.

It is certified that error appears in the above-identified patent and that said Letters Patent is hereby corrected as shown below:

Claim 1, col. 8, line 23, replace "inter-val" with --interval--

Claim 1, col. 8, line 28, replace "time-stamp" with --timestamp--

Claim 9, col. 9, line 21, replace "time-stamp" with --timestamp--

Signed and Sealed this

Sixth Day of April, 2010

David J. Kappos
*Director of the United States Patent and Trademark Office*